(12) United States Patent
Naidoo et al.

(10) Patent No.: US 6,690,411 B2
(45) Date of Patent: *Feb. 10, 2004

(54) SECURITY SYSTEM

(75) Inventors: Surendra N. Naidoo, Austin, TX (US); William P. Glasgow, Austin, TX (US)

(73) Assignee: @Security Broadband Corp., Austin, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/357,196

(22) Filed: Jul. 20, 1999

(65) Prior Publication Data

US 2002/0167590 A1 Nov. 14, 2002

(51) Int. Cl.[7] .............................. H04N 7/18; H04N 9/47; G08B 13/00
(52) U.S. Cl. ...................................... 348/143
(58) Field of Search ................... 348/143, 150, 348/151, 152, 153, 154, 155, 160, 169, 170; 382/151, 141; 340/541, 505, 825.06, 525; G08B 13/00; H04N 7/18, 9/47

(56) References Cited

U.S. PATENT DOCUMENTS

| 4,591,834 A | 5/1986 | Kyle ........................... 340/566 |
| 4,918,717 A | 4/1990 | Bissonnette et al. .......... 379/40 |

(List continued on next page.)

FOREIGN PATENT DOCUMENTS

| BE | 1008939 | 10/1996 |
| CA | 2203813 | 6/1996 |
| CA | 2174482 | 10/1997 |
| GB | 2286423 | 8/1995 |
| GB | 2291554 | 1/1996 |
| GB | 2320644 | 6/1998 |
| GB | 2325548 | 11/1998 |
| JP | 6339183 | 12/1994 |
| TW | 340934 | 9/1998 |
| WO | WO 89/11187 | 11/1989 |
| WO | WO 95/13944 | 5/1995 |
| WO | WO 97/13230 | 4/1997 |
| WO | WO 98/25243 | 6/1998 |
| WO | WO 98/52343 | 11/1998 |
| WO | WO 98/59256 | 12/1998 |
| WO | WO 02/11444 | 2/2002 |

OTHER PUBLICATIONS

GrayElectronics, http://www.grayelectronics.com/default.htm.
visitalk.com—communication with vision, http://www.visitalk.com.
Genex OmniEye, http://www.genextech.com/prod01.htm.

Primary Examiner—Chris Kelley
Assistant Examiner—Tung Vo
(74) Attorney, Agent, or Firm—Conley Rose, P.C.

(57) ABSTRACT

A system and method for enabling a central station to accurately verify in real-time whether an alarm signal generated by a security base station is a false alarm, and for enabling remote users to securely access features of the security base station such as remote surveillance, activating and deactivating the system, and adjusting alarm sensitivities.

43 Claims, 3 Drawing Sheets

U.S. PATENT DOCUMENTS

| | | | |
|---|---|---|---|
| 4,962,473 A * | 10/1990 | Grain | 364/900 |
| 5,164,703 A | 11/1992 | Rickman | 340/515 |
| 5,164,979 A | 11/1992 | Choi | 379/40 |
| 5,283,816 A | 2/1994 | Gomez Diaz | 379/40 |
| 5,400,011 A | 3/1995 | Sutton | 340/566 |
| 5,406,260 A | 4/1995 | Cummings et al. | 340/568 |
| 5,414,409 A | 5/1995 | Voosen et al. | 340/541 |
| 5,414,833 A | 5/1995 | Hershey et al. | 395/575 |
| 5,448,290 A | 9/1995 | VanZeeland | 348/153 |
| 5,452,344 A | 9/1995 | Larson | 379/107 |
| 5,510,975 A | 4/1996 | Ziegler, Jr. | 364/148 |
| RE35,268 E | 6/1996 | Frolov et al. | 340/545 |
| 5,525,966 A | 6/1996 | Parish | 340/568 |
| 5,526,428 A | 6/1996 | Arnold | 380/25 |
| 5,534,845 A | 7/1996 | Issa et al. | 340/425.5 |
| 5,541,585 A | 7/1996 | Duhame et al. | 340/825.69 |
| 5,543,778 A | 8/1996 | Stouffer | 340/539 |
| 5,550,984 A | 8/1996 | Gelb | 395/200.17 |
| 5,557,254 A | 9/1996 | Johnson et al. | 340/426 |
| 5,570,079 A | 10/1996 | Dockery | 340/541 |
| 5,572,438 A | 11/1996 | Ehlers et al. | 364/492 |
| 5,602,918 A | 2/1997 | Chen et al. | 380/21 |
| 5,604,493 A | 2/1997 | Behlke | 341/22 |
| 5,606,615 A | 2/1997 | Lapointe et al. | 380/25 |
| 5,621,662 A | 4/1997 | Humphries et al. | 364/550 |
| 5,625,410 A * | 4/1997 | Washino et al. | 348/154 |
| 5,629,687 A | 5/1997 | Sutton et al. | 340/825.37 |
| 5,631,630 A | 5/1997 | McSweeney | 340/522 |
| 5,638,046 A | 6/1997 | Malinowski | 340/539 |
| 5,652,567 A | 7/1997 | Traxler | 340/552 |
| 5,675,321 A | 10/1997 | McBride | 340/568 |
| 5,680,131 A | 10/1997 | Utz | 341/176 |
| 5,682,133 A | 10/1997 | Johnson et al. | 340/426 |
| 5,686,885 A | 11/1997 | Bergman | 340/514 |
| 5,689,235 A | 11/1997 | Sugimoto et al. | 340/541 |
| 5,689,708 A | 11/1997 | Regnier et al. | 395/682 |
| 5,691,697 A | 11/1997 | Carvalho et al. | 340/544 |
| 5,694,595 A | 12/1997 | Jacobs et al. | 395/609 |
| 5,696,486 A | 12/1997 | Poliquin et al. | 340/506 |
| 5,696,898 A | 12/1997 | Baker et al. | 395/187.01 |
| 5,706,191 A | 1/1998 | Bassett et al. | 364/138 |
| 5,712,679 A | 1/1998 | Coles | 348/158 |
| 5,714,933 A | 2/1998 | Le Van Suu | 340/568 |
| 5,717,378 A | 2/1998 | Malvaso et al. | 340/506 |
| 5,719,551 A | 2/1998 | Flick | 340/426 |
| 5,726,912 A | 3/1998 | Krall, Jr. et al. | 364/550 |
| 5,736,927 A | 4/1998 | Stebbins et al. | 340/506 |
| 5,737,391 A | 4/1998 | Dame et al. | 379/37 |
| 5,748,084 A | 5/1998 | Isikoff | 340/568 |
| 5,748,089 A | 5/1998 | Sizemore | 340/574 |
| 5,757,616 A | 5/1998 | May et al. | 361/683 |
| 5,761,206 A | 6/1998 | Kackman | 370/476 |
| 5,774,051 A | 6/1998 | Kostusiak | 340/539 |
| 5,784,461 A | 7/1998 | Shaffer et al. | 380/21 |
| 5,784,463 A | 7/1998 | Chen et al. | 380/21 |
| 5,793,028 A | 8/1998 | Wagener et al. | 235/380 |
| 5,793,763 A | 8/1998 | Mayes et al. | 370/389 |
| 5,801,618 A * | 9/1998 | Jenkins | 340/426 |
| 5,805,056 A | 9/1998 | Mueller et al. | 340/426 |
| 5,805,064 A | 9/1998 | Yorkey | 340/550 |
| 5,809,013 A | 9/1998 | Kackman | 370/253 |
| 5,812,054 A | 9/1998 | Cohen | 340/506 |
| 5,845,070 A | 12/1998 | Ikudome | 395/187.01 |
| 5,854,588 A | 12/1998 | Dockery et al. | 340/541 |
| 5,859,966 A | 1/1999 | Hayman et al. | 395/186 |
| 5,861,804 A | 1/1999 | Fansa et al. | 340/539 |
| 5,867,484 A * | 2/1999 | Shaunfield | 370/254 |
| 5,877,696 A | 3/1999 | Powell | 340/825.32 |
| 5,881,226 A | 3/1999 | Veneklase | 395/188.01 |
| 5,892,442 A | 4/1999 | Ozery | 340/539 |
| 5,898,831 A | 4/1999 | Hall et al. | 395/187.01 |
| 5,933,098 A * | 8/1999 | Haxton | 340/945 |
| 6,002,430 A * | 12/1999 | McCall et al. | 348/207 |
| 6,069,655 A | 5/2000 | Seeley et al. | |
| 6,091,771 A | 7/2000 | Seeley et al. | 375/154 |
| 6,097,429 A * | 8/2000 | Seeley et al. | 348/154 |
| 6,108,034 A * | 8/2000 | Kim | 348/154 |
| 6,154,133 A * | 11/2000 | Ross et al. | 340/541 |
| 6,226,031 B1 * | 5/2001 | Barraclough et al. | 348/14.13 |
| 6,271,752 B1 * | 8/2001 | Vaios | 340/541 |
| 6,392,538 B1 * | 5/2002 | Shere | 340/539 |

* cited by examiner

SECURITY SYSTEM

BACKGROUND OF THE INVENTION

1. Field of the Invention

The present invention relates generally to security systems. Specifically, this invention relates to a device and method for the remote verification and monitoring of conditions surrounding an alarm signal. In addition, this invention relates to a device and method for the remote access of security system features.

2. Description of Related Art

Inherent in security systems is the problem of false alarms. Especially when local authorities are notified of alarms, false alarms can result in the owner of the system being subject to significant fines. In addition, false alarms waste the limited resources available to the authorities to respond to legitimate alarm situations. It is therefore desirable that a security system permits verification of detected alarm events.

One approach to obtaining such verification is through the use of separate audio monitors operating in concert with separate alarm sensors. U.S. Pat. Nos. 4,591,834 and 4,918,717 are directed to such systems. For example, U.S. Pat. No. 4,591,834 refers to the use of miniature, low-frequency dynamic microphones. Alarm activities noted at the microphones are verified via a separate network of discriminator sensors which comprise geophones. Signal processing techniques are utilized to distinguish alarm activity. Intrusion and discriminator sensors are arranged in known patterns comprised of multiple sensors of each type. U.S. Pat. No. 4,918,717 refers to a system wherein a number of microphones are distributed about a secured premises in relation to other intrusion sensors. Upon detection of an intrusion alarm, the microphones can be manually enabled one at a time from the central station to allow an operator to listen to audio activity in proximity to the sensor alarm.

Another approach is the use of video images to monitor a location. However, in prior art devices these images have been low-resolution, freeze-frame pictures, making it difficult for a viewer to discern what is being shown. In addition, in many prior art devices, the video images may not be received by the monitoring party until several moments have passed after the recorded event has actually taken place likely causing any response to be late and less effective.

An additional problem with some existing security systems is that once a person has left the property, it is common for that person to worry that he or she has forgotten to activate or arm the security system. In addition, such persons may have the desire to monitor the property even in the absence of alarm events. In prior art systems, it has been necessary to telephone a neighbor to ask them to check on the property and report back to the person.

SUMMARY OF THE INVENTION

The present invention overcomes the above-described problems with prior art security systems. With the security system described in the present invention, a base station may be configured to transmit in real-time an alarm signal and sequences of video to a central station for verification of the alarm event. Security monitoring personnel at the central station may thereby view video corresponding to the alarm event to determine if the alarm signal is a false alarm or not. Advantageously, this determination may be made very shortly after the occurrence of the event giving rise to the alarm signal. Thus, the authorities may be notified in time to respond in a useful manner. In addition, the present invention may be configured such that the base station may use the video rather than separate alarm sensors to determine if an alarm event has occurred. In other embodiments, the present invention may be configured to use both video and alarm sensors to determine if an alarm event has occurred.

In addition, the present invention may be configured to allow remote users to access features of the base station. In one embodiment, the remote user connects to the central station over the Internet. In this embodiment the user may connect using an Internet Web browser such as Microsoft's INTERNET EXPLORER or Netscape's NAVIGATOR, or alternatively, an alarm-system specific application. The central station then verifies the identity of the remote user. Verification methods include but are not limited to the use of a username and password or the equivalent. Upon verification, the central station operates to create a secure connection directly (i.e., substantially all data traffic is not necessarily routed through the central station) between the base station and the remote user. Advantageously, this helps to avoid network bottlenecks since substantive data (i.e., from remote surveillance) does not necessarily pass through the central station. Rather, it may be routed through the Internet between the base station and remote user in a secure manner.

In one respect, the present invention may comprise a base station that is configured to generate an alarm signal in response to an occurrence of an alarm event, and to generate an alarm video corresponding to the alarm event; and a central station coupled through a network to receive the alarm signal and alarm video from the base station in substantially real-time. The network may be the Internet. In one embodiment, the base station may be configured to detect the occurrence of the alarm event. For example, the present invention may comprise one or more sensor units which may be configured to detect the occurrence of an alarm event and to convey an indication of the occurrence to the base station. The central station may be operable to utilize the alarm video to assist in the verification of said alarm signal.

In addition, the invention may comprise a video camera coupled to transmit video to the base station, wherein the base station is configured to generate from the video an alarm video corresponding to the alarm event. Further, the base station may be configured to detect the occurrence of the alarm event utilizing the video. The video camera may be a 360-degree camera. In one embodiment, the alarm video may correspond to an interval of time beginning at or before the occurrence of the alarm event. In addition, the alarm video may correspond to an interval of time ending after the occurrence of the alarm event, or alternatively, after a predetermined duration.

In one embodiment, the base station may be coupled to the central station through the network via a high-speed network connection. Examples of high-speed network connections include cable-modem connections, xDSL connections, and wireless connections.

In addition, the present invention may comprise a remote station operable to communicate with the base station and the central station through the network; wherein the central station may be configured to create a data connection between the remote station and the base station such that subsequent communications between the remote station and the base station bypass the central station. In this embodiment, the central station may be configured to create the secure data connection after authenticating the remote station. The remote station may be operable to access the base station in order to control what constitutes the occurrence of the alarm event. The remote station may also be operable to control the activation and deactivation of the base station, and to access one or more functions of the base station. The one or more functions may comprise remote surveillance.

Further, in one embodiment of the present invention, the central station may be substantially continuously coupled to the base station through the Internet. In addition, the central station may be operable to detect in substantially real-time if it becomes uncoupled from the base station.

In one embodiment, the alarm video may further comprise audio. In this embodiment, the central station may be operable to transmit audio signals to the base station, and the base station may be operable to play these audio signals.

In addition, the base station may comprise a user interface operable to activate and deactivate the base station. In one embodiment, the user interface may be a keypad. Alternatively, the user interface may be a receiver configured to activate and deactivate the base station in response to signals from a remote transmitter.

In another respect, the present invention may comprise a base station connected to the Internet, the base station configured to detect an occurrence of an alarm event and to generate an alarm signal in response to detecting said occurrence of the alarm event; a video camera coupled to the base station, the video camera operable to transmit video to the base station, wherein the base station is configured to generate an alarm video corresponding to the alarm event from the video transmitted by the video camera; and a central station connected to the Internet, the central station configured to receive the alarm signal and the alarm video from the base station through the Internet in substantially real-time, and wherein said central station is operable to utilize the alarm video to assist in the verification of the alarm signal.

In addition, one embodiment of the present invention may further comprise a remote station operable to communicate with the base station and the central station through the Internet; wherein the central station may be configured to create a data connection between the remote station and the base station such that subsequent communications between the remote station and the base station bypass the central station. In this embodiment, the central station may be configured to create the secure data connection after authenticating the remote station. The remote station may be operable to access the base station in order to control what constitutes the occurrence of the alarm event. The remote station may also be operable to control the activation and deactivation of the base station, and to access one or more functions of the base station. The one or more functions may comprise remote surveillance.

In another respect, the present invention may be a method for a remote unit to obtain access to a base station within a security system, comprising the remote unit connecting to a central station within the security system; the remote unit supplying authorization information to the central station; the central station authenticating the remote unit by utilizing the authorization information; the central station establishing a connection between the remote unit and the base station such that subsequent communications between the remote unit and the base station bypass the security unit. In one embodiment, the method may further comprise the remote unit utilizing the connection in order to access one or more functions of the base station such as remote surveillance, the activation and deactivation of the security system, and the controlling of what constitutes an occurrence of an alarm event.

In another respect, the present invention may be a method for verifying an alarm signal in a security system, comprising detecting an occurrence of an alarm event at a location; a base station that is monitoring that location generating an alarm signal and an alarm video corresponding to the occurrence of the alarm event; the base station conveying the alarm signal and the alarm video to a central station in real-time; and an operator at the central station viewing the alarm video and determining if the occurrence of the alarm event corresponds to a false alarm in response to said viewing.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

It is to be noted, however, that the appended drawings illustrate only exemplary embodiments of the invention and are therefore not to be considered limiting of its scope, for the invention may admit to other equally effective embodiments.

DESCRIPTION OF ILLUSTRATIVE EMBODIMENTS

The following examples are included to demonstrate embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Figure 1:
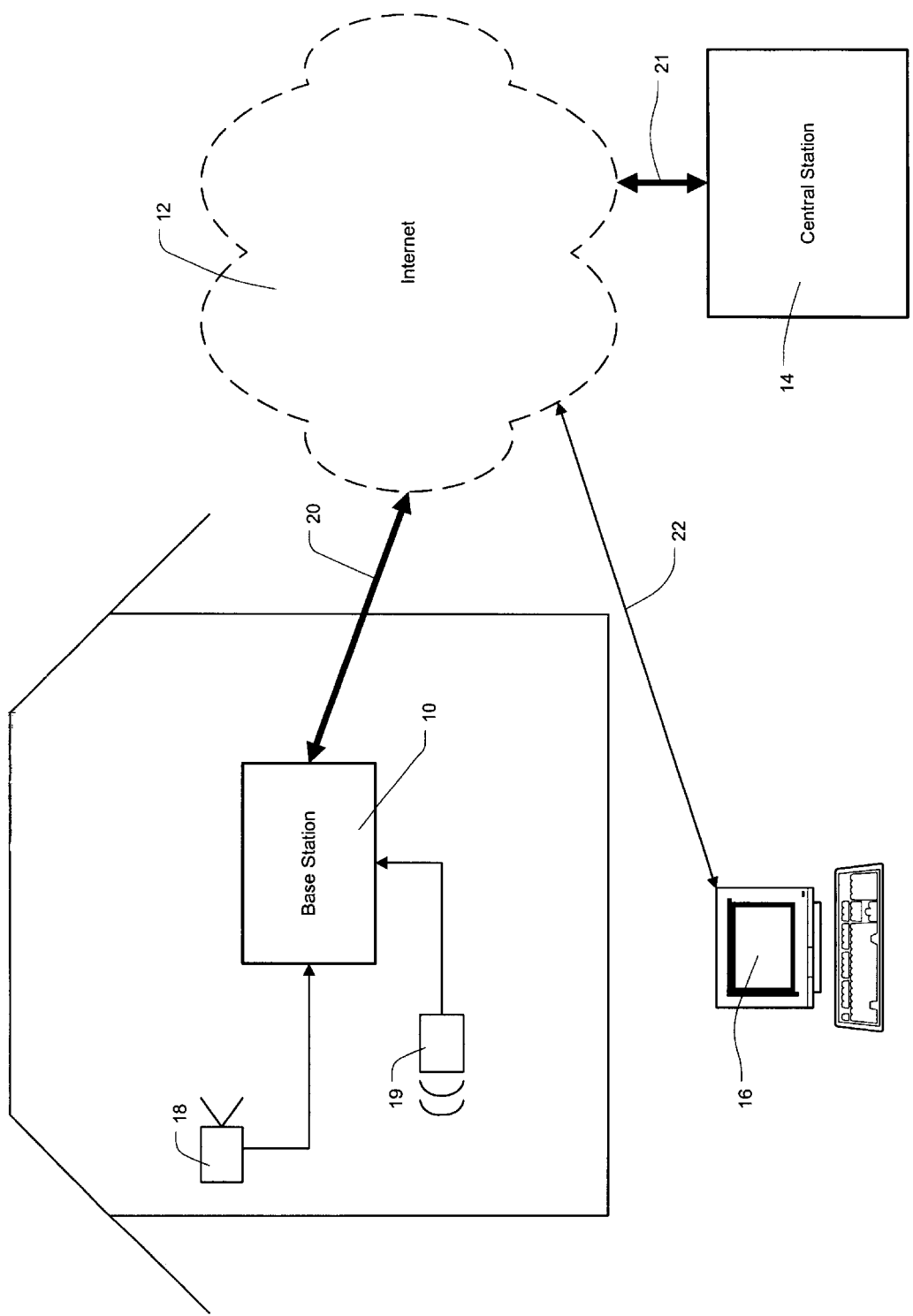
FIG. 1 is a simplified block diagram of a security system according to one embodiment of the disclosed apparatus and method.

FIG. 1 illustrates an exemplary embodiment of the disclosed security system. As shown, the security system may comprise base station 10 coupled through network 12 to central station 14. As shown, network 12 may be the Internet. In other embodiments, network 12 may be a wide area network (WAN) or an Internet.

In one embodiment, base station 10 may be a stand-alone unit located at a home or other location that is to be protected by the security system. Alternatively, base station 10 may be a computing device or networkable appliance, running software that provides the functionality described herein. In addition, the illustrative embodiment may include video camera 18 that is operable to transmit video to base station 10. Camera 18 may but is not required to be a 360-degree camera or a panoramic camera.

Central station 14 generally is a centralized computing facility operable to provide the services described herein including, but not limited to verifying and responding alarm signals, authenticating remote users, store customer data, and remote monitoring. Though central station 14 may be described conceptually as "centralized," it may actually be physically distributed over several network locations on network 12. For example, in one embodiment in which base station 10 is connected to network 12 through a cable modem connection, some of the central station 14 functionality may take place at a respective cable headend corresponding to said cable modem connection, while the remaining functionality is implemented at other locations on network 12.

In addition, in some embodiments, part or all of central station 14 may be implemented in a redundant manner at different network locations.

Upon detection of an alarm event, base station 10 transmits an alarm signal and video corresponding to the alarm event (this video may be referred to as "alarm video") to central station 14 in substantially "real-time". In the present disclosure, the term "real-time" transmission is intended to generally mean that no substantive time period elapses between the captured event and the receipt of alarm video corresponding to the event by the central station. The central station may use the transmitted alarm video to aid in the determination of whether the alarm signal is a false alarm or not. Advantageously, the real-time transmission permits the central station 14 to respond to an alarm signal in a timely manner. Timely response may increase the chance of apprehending an intruder, and in the case of life-threatening circumstances, reduce the likelihood of injury or death. Upon verification of the alarm signal, an operator at the central station 14 may take any appropriate action including, but not limited to, contacting the proper authorities, and/or directing the base station 10 to sound an alarm.

The security system may also include sensors coupled to base station 10 as shown, the security system includes alarm sensor 19 coupled to base station 10. Many types of sensors may be used, depending on the desired types and levels of protection. Examples include, without limitation, magnetic contact switches, intelligent audio sensors, infra-red sensors, motion detectors, fire alarms, and carbon monoxide sensors. The type of sensor to be used depends on the specific application for which the security system is designed. In some embodiments, multiple alarm sensors may be used. In multiple sensor embodiments, base station 10 may consider data from all, some, or one of the sensors in the detection of alarm events. Alternatively, in other embodiments separate alarm sensors may be omitted altogether.

Whether separate alarm sensors are present or not, base station 10 may use video from video camera 18 to assist in the determination of whether an alarm event exists and thereby whether to generate and send an alarm signal to central station 14. For example, in one embodiment, separate sensors such as motion detectors, infra-red and audio sensors could be replaced by an intelligent alarm that is able to detect motion by analyzing the video image. In another embodiment, the intelligent alarm sensor may also analyze sounds to determine if an alarm event exists. The intelligent alarm application may reside in base station 10 and analyze each image and audio sound (if present) to detect an alarm event. In some embodiments, the sensitivity of the system may be adjusted based upon the size and speed of intruders. For example, the system may be adjusted to trigger an alarm if a dog walks across a monitored driveway but not a bird flying through. Advantageously, a visual intelligent security system based on changes in the video image eliminates the need for many sometimes expensive hardware sensors. In addition, a visual intelligent security system may be easier to setup, maintain and upgrade since the intelligent alarm application may be programmable. Intelligent alarm applications typically require a significant amount of processing by the base station 10. In one embodiment, the base station may include a processor and memory to record and process video information for the intelligent alarm application.

Advantageously, the present invention overcomes this limitation of the prior art through the use of high-speed connections 20 and 21. In the present disclosure, the term "high-speed connections" generally means those connections capable of providing enough bandwith for data to be transmitted to tyhe central station in real-time. In one embodiment, high-speed connections 20 and 21 are capable of transmitting at speeds of at least 128 KBPS. High-speed connections that may be available to consumers generally included but are not limited to cble modem connections, xDSL connections, and wireless connections.

As shown, high-speed connection 20 may be substantially continuous. Advantageously, this eliminates the need for the base station to dial up the Internet service or monitoring station when an alarm is detected. Dialing up and connecting via a modem over the PSTN may take around 10–15 seconds. This combined with the traditionally slow transfer times, results in a delay of the video which may cause the monitoring station to be unable to view it in substantially real time. In addition, the central station 14 may be operable to detect whether base station 10 is properly coupled to it. For example, in one embodiment, central station 14 may "ping" base station 10 on a regular basis through network 12; if central station 14 does not receive a response from base station 10, monitoring personnel at central station 14 can take appropriate action. Preferably, central station 14 may "ping" base station 10 with enough frequency such that appropriate action may be taken in a timely manner if base station 10 becomes uncoupled from central station 14. In one embodiment, central station 14 may be configured to "ping" base station 10 at least once every minute.

In this illustrative embodiment, a remote user 16 is operable to remotely access features of base station 10. As described in detail in FIG. 2, remote user 16 must first be authenticated by central station 14. The remote user 16 may connect to central station 14 and base station 10 (after authentication) through network 12. Remote user 16 may use a low bandwidth connection for connection 22. Once authenticated, remote user may access some or all of the features of base station 10. These features may include, without limitation, arming or disarming the security system; adjusting sensitivities of sensors (if present); adjusting alarm event detection sensitivity; remote surveillance; adjusting camera settings; and reviewing alarms and recordings.

In one embodiment, remote user 16, once authenticated, may perform remote surveillance through base station 10. The remote surveillance feature allows remote user 16 to view all or portions of the video signal from video camera 18. Depending on the bandwidth of the connection, the video may be of a lower quality than that transmitted to central station 14 for verification of alarm signals. For example, in one embodiment, the video transmitted to remote user 16 may have a lower frame rate, lower resolution, and/or lower color depth. In addition, the remote user may be able to configure the quality of the video for remote monitoring.

Figures 2, 3:
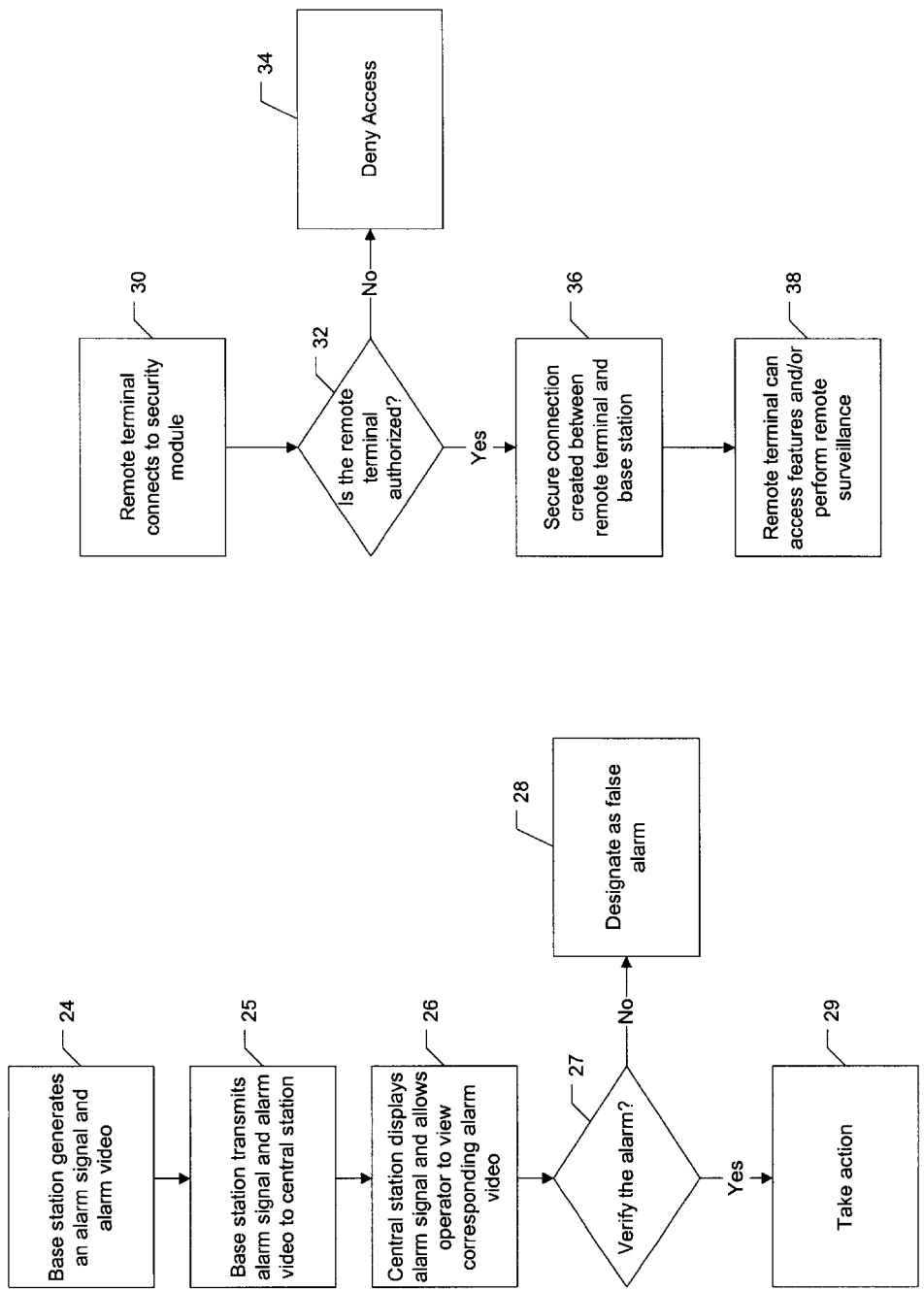
FIG. 2 is a flowchart of the verification of an alarm signal according to one embodiment of the disclosed apparatus and method.
FIG. 3 is a flowchart of the authentication of a remote terminal according to one embodiment of the disclosed apparatus and method.

Referring now to FIG. 2 a flowchart diagram is shown illustrating operation of the present invention where central station 14 verifies an alarm signal sent by base station 10. The flowchart of FIG. 2 presumes that base station 10 has detected an alarm event and is connected to the central station 14 through network 12 as shown in FIG. 1.

In step 24 base station 10 generates an alarm signal corresponding to a detected alarm event. Optionally, upon detection of an alarm event, base station 10 may activate a siren, ring a bell, and/or otherwise sound an audio alarm. Advantageously, this may scare away burglars, trespassers, etc. while central station 14 verifies the alarm signal.

In step 25 base station 10 transmits the alarm signal and an alarm video corresponding to said alarm event to central station 14. In the present disclosure, the term "alarm video" shall mean generally a segment of video corresponding in time to an alarm event. The alarm signal may but is not required to contain information regarding the detected alarm event including, but not limited to, the type of sensor that detected it, and data from that sensor regarding the detected alarm event. Optionally, after base station 10 detects an alarm, it may be operable to transmit the alarm signal and alarm video corresponding to the alarm event automatically to the customer (whose home, business, or other location is being monitored) at an email address.

The alarm video transmitted along with said alarm signal to central station 14 may be used to assist central station 14 monitoring personnel to verify whether the alarm is false. The alarm video may begin just prior to the occurrence of the alarm event and may end upon after the conclusion of the alarm event, or alternatively, after a specified duration. Preferably, the segment shows enough of a time period to provide central station 14 with enough information to determine whether the alarm signal is a false alarm or not. In some embodiments, the segment of real-time video may be compressed using any compression techniques known by one of skill in the art. For example, this may involve the use of video compression algorithms such as "mpeg". For example, if video camera 18 captures video at 16 frames per second, base station 10 may compress it and transmit an alarm video at 8 frames per second to central station 14. Further, the resolution and/or color depth of the video may be reduced to reduce the required transmission bandwidth.

In one embodiment, base station 10 transmits alarm video to central station 14 at at least 3 frames per second. In addition, the alarm video may have an end resolution (i.e., after interpolation and/or image enhancement, etc.) of 320 pixels by 240 pixels or higher, and optionally may be transmitted in color. Further, said alarm video may but is not required to include a corresponding audio portion.

In step 26, central station 14 displays alarm signals and allows monitoring personnel or other users of central station 14 to view the corresponding alarm video. Preferably, the alarm video is received and displayed by central station 14 closely in time to the detection of the alarm event such that if follow up action is necessary, it can take place in a timely manner. For example, if the base station 10 detects an alarm event corresponding to a possible fire, it is imperative monitoring personnel at central station 14 notify the fire department as quickly as possible.

In step 27, a monitoring person or monitoring personnel at central station 14 verifies whether the alarm signal corresponds to an actual alarm event using the alarm signal information and the segment of real-time video. In some instances, said alarm video which may or may not include audio is indeterminate as to whether the alarm signal is a false alarm. Advantageously, various embodiments of the present invention s address this problem. For example, central station 14 may be configured to request additional video from base station 10. In addition, central station 14 may be configured to initiate two-way audio communication with the monitored location to attempt to obtain more information. Alternatively, monitoring personnel may call the monitored location to try to determine whether the alarm signal is false. In this embodiment, base station 10 includes an audio transmitter such as a speaker, and an audio receiver, such as a microphone. In some embodiments, central station 14 may be instructed or configured to treat indeterminate alarm signals as authentic.

In step 28, the monitoring person or monitoring personnel at central station 14 determines that the alarm signal is a false alarm. In one embodiment, central station 14 may inform their base station 10 of this designation such that base station 10 can take any appropriate follow up action(s). For example, base station 10 may immediately turn off any siren, bell, or other audio alarm. Other examples include but are not limited to base station 10 resetting itself, logging the event, and/or adjusting its sensitivity settings to try to avoid future false alarms. Further, central station 14 may be configured to either manually and/or automatically adjust said sensitivity settings to potentially avoid future false alarms.

In step 29, if central station 14 is unable to verify the alarm signal is false, it may take the appropriate action(s). In many embodiments, the appropriate action may include contacting the proper authorities such as the police department, fire department, and/or emergency medical services. Other actions include without limitation directing base station 10 to activate a siren, bell, or other audio alarm, and initiating a two-way audio communications with the monitored location.

Referring now to FIG. 3 a flowchart diagram is shown illustrating operation of the present invention authenticating and allowing access to features of base station 10. The flowchart of FIG. 3 presumes that base station 10 is connected to the central station 14 through network 12 as shown in FIG. 1.

In step 30, the remote terminal may connect to the security module. In an exemplary embodiment, the remote terminal may connect using an Internet World Wide Web browser such as Netscape's NAVIGATOR or Microsoft's INTERNET EXPLORER.

The type of authentication used in remote authorization step 32 may take many forms. For example, in one embodiment the security module may require some sort of a username and password combination. Further, it is to be understood by the disclosure of one of skill in the art that any other procedure suitable for authenticating the identity of remote terminal 16 may be used.

In step 34, the remote user is denied access to base station 10 and its features. Central station 14 may be configured to take precautions against unauthorized access, including but not limited to logging incidents of denied access.

In step 36, a connection is created between remote terminal 16 and base station 10. Preferably the connection is a secure connection. Advantageously a secure connection minimizes some, if not most, security concerns often associated with the transfer of information over the Internet.

In step 38, utilizing the connection created in step 36, remote terminal 16 may access remote features of base station 10. Once authenticated, remote user 16 may access some or all of the features of base station 10. These features may include, without limitation, arming or disarming the security system; adjusting sensitivities of sensors (if present); adjusting alarm event detection sensitivity; remote surveillance; adjusting camera settings; and reviewing alarms and recordings. Camera settings may include without limitation pan, tilt, focus, brightness, contrast and zoom.

Figure 4:
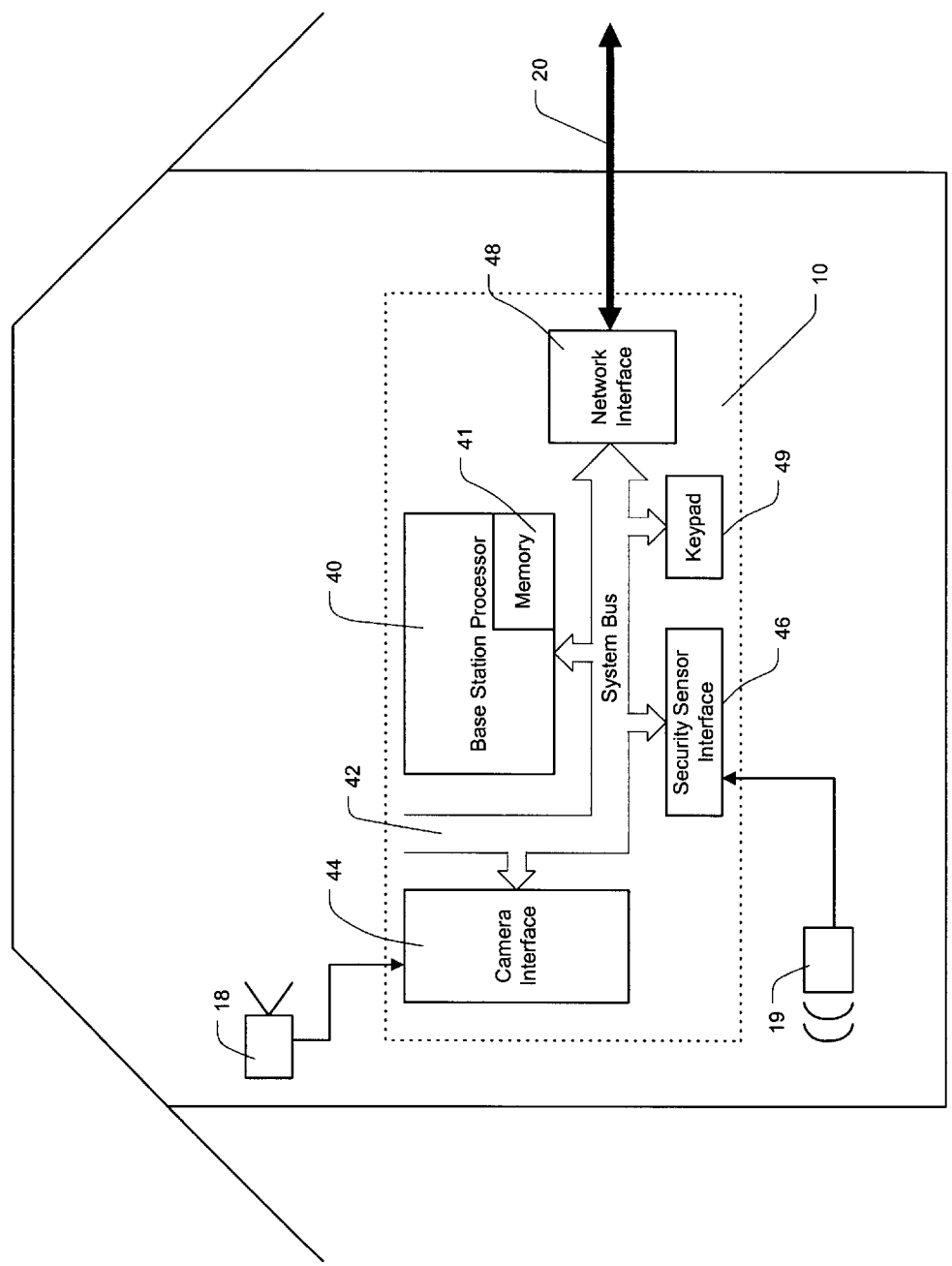
FIG. 4 is a block diagram of a base station according to one embodiment of the disclosed apparatus and method.

FIG. 4 illustrates a base station according to one embodiment of the present invention. As shown, base station 10 may include processor 40, system bus 42, camera interface 44, sensor interface 46, network interface 48, keypad 49, and memory 41. Processor 40 may be coupled to video interface 44, sensor interface 46, network interface 48, and keypad 49 through system bus 42. In another embodiment (not illustrated), processor 40 may also be coupled to memory 41 through system bus 42.

Processor 40 may perform many functions including but not limited to analyzing data from alarm sensor 19 and/or video camera 18 to determine whether an alarm event exists; accessing data stored in memory 41; generating alarm video to transmit to central station 14 in response to detection of an alarm event; and communicating with central station 14 and remote user 16 through network interface 48.

Video camera 18 may transmit video to processor 40 through video interface 44. If video camera 18 is analog, video interface 44 may digitize the video before transmitting it to processor 40. Similarly, alarm sensor 19 may transmit data to processor 40 through sensor interface 46.

Network interface 48 may serve as gateway between base station 10 and network 12 (through connection 20). Network interface 48 may be comprise software and hardware including, but not limited to a cable modem, an xDSL modem, and/or a network interface card. In some embodiments, network interface 48 may be physically separate from the other components of base station 10. Regardless of its form, network interface 48 assists in the communication of data to and from central station 14.

As shown, base station 10 may buffer video from video camera 18 in memory 41. Then, based on predefined criteria, older video that is not considered essential to any alarm signals may be discarded. In addition, base station 10 may be configured to record alarm events and associated data in memory 41. Alternatively, central station 14 may be configured to record alarm events and associated data. Specifically, central station 14 may be configured to record video, or portions thereof, on some predetermined basis corresponding to the requirements of the customer. This non-alarm video may be stored by central station 14 for later retrieval by the customer. In one embodiment, the customer or remote user 16 may able to adjust said predetermined basis including without limitation adjusting the recording times, duration, and total length of recordings.

In addition, base station 10 may include a user interface that can activate or deactivate the security system. In the illustrative embodiment, the user interface is a keypad 49. The user could thereby activate or deactivate the system by entering a predetermined code on the keypad. It will be understood with the benefit of this disclosure of those of skill in the art that any other type of user interface may be used with this invention. For example, base station 10 may be activated or deactivated with a remote portable transmitter.

While the invention may be adapted to various modifications and alternative forms, specific embodiments have been shown by way of example and described herein. However, it should be understood that the invention is not intended to be limited to the particular forms disclosed. Rather, the invention is to cover all modifications, equivalents and alternatives falling within the spirit and scope of the invention as defined by the appended claims. Moreover, the different aspects of the disclosed apparatus and methods may be utilized in various combination and/or independently. Thus, the invention is not limited to only those combinations shown herein, but rather may include other combinations.

What is claimed is:

1. A security system, comprising:
   a base station;
   a video camera coupled to transmit video to said base station;
   one or more sensor units configured to detect an occurrence of an alarm event and convey an indication of said occurrence of said alarm event to said base station;
   a central station operable to communicate with said base station through a network;
   said base station configured to: (1) generate an alarm signal in response to receipt of said indication of said alarm event, (2) generate an alarm video in response to receipt of said indication of said occurrence of said alarm event, said alarm video corresponding in time to said alarm event and generated from said video transmitted to said base station by said video camera, (3) transmit said alarm signal to said central station in substantially real-time; and (4) transmit said alarm video to said central station in substantially
   a remote station operable to communicate with said base station and said central station through said network;
   wherein said central station is configured to create a secure data connection between said remote station and said base station such that subsequent communications between said remote station and said base station bypass said central station, said central station creating said secure data connection between said remote station and said base station after said central station has authenticated said remote station.

2. The security system of claim 1, wherein said central station is operable to utilize said alarm video to assist in the verification of said alarm signal.

3. The security system of claim 1 wherein said video camera is a 360-degree camera.

4. The security system of claim 1, wherein said alarm video corresponding in time to said alarm event corresponds to an interval of time beginning at or before said occurrence of said alarm event.

5. The security system of claim 4, wherein said alarm video corresponding in time to said alarm event corresponds to an interval of time ending after said occurrence of said alarm event.

6. The security system of claim 4, wherein said alarm video corresponding in time to said alarm event corresponds to an interval of time ending after a predetermined duration.

7. The security system of claim 1, wherein said base station is coupled to said central station through said network via a high-speed network connection.

8. The security system of claim 7, wherein said high-speed network connection is a cable-modem connection.

9. The security system of claim 7, wherein said high-speed network connection is an xDSL connection.

10. The security system of claim 7, wherein said high-speed network connection is a wireless connection.

11. The security system of claim 1, wherein said remote station is operable to control what constitutes said occurrence of said alarm event.

12. The security system of claim 1, wherein said remote station is operable to control activation of said base station.

13. The security system of claim 1, wherein said remote station is operable to control deactivation of said base station.

14. The security system of claim 1, wherein said remote unit is operable to access one or more functions of said base station.

15. The security system of claim 14, wherein said one or more functions of said base station comprises remote surveillance.

16. The security system of claim 1, wherein said alarm video further comprises audio.

17. The security system of claim 16, wherein said central station is operable to transmit audio signals to said base station, and said base station is operable to play said audio signals.

18. The security system of claim 1, wherein said base station further comprises a user interface operable to activate and deactivate said base station.

19. security system of claim 18, wherein said user interface is a keypad.

20. The security system of claim 18, wherein said user interface is a receiver configured to activate and deactivate said base station in response to signals from a remote transmitter.

21. The security system of claim 1, wherein said network is the Internet.

22. The security system of claim 21, wherein said central station is substantially continuously coupled to said base station through the Internet.

23. The security system of claim 22, wherein said central station is operable to detect in substantially real-time if said central station becomes uncoupled from said base station.

24. A security system, comprising:
- a base station coupled to the Internet;
- a central station coupled to the Internet;
- one or more sensor units configured to detect an occurrence of an alarm event and convey an indication of said occurrence of said alarm event to said base station;
- a video camera coupled to said base station, said video camera operable to transmit video to said base station;
- said base station configured to: (1) generate an alarm signal in response to receipt of said indication of said alarm event, (2) generate an alarm video in response to receipt of said indication of said occurrence of said alarm event, said alarm video corresponding in time to said alarm event and generated from said video transmitted to said base station by said video camera, (3) transmit said alarm signal to said central station in substantially real-time, and (4) transmit said alarm video to said central station in substantially real-time;
- said central station configured to: (1) receive, in substantially real time, said alarm signal from said base station through the Internet, (2) receive, in substantially real time, said alarm video from said base station through the Internet; and
- a remote station operable to communicate with said base station and said central station through the Internet;
- said central station configured to create a secure data connection between said remote station and said base station such that subsequent communications between said remote station and said base station bypass said central station, said central station further configured to authenticate said remote station and enable creation of said secure data connection between said remote station and said base station subsequent to authentication of said remote station by said central station.

25. The security system of claim 24, wherein said remote unit is operable to access one or more functions of said base station.

26. The security system of claim 24, wherein said central station is operable to utilize said alarm video to assist in the verification of said alarm signal.

27. The security system of claim 24, wherein said alarm video corresponding in time to said alarm event corresponds to an interval of time beginning at or before said occurrence of said alarm event.

28. The security system of claim 27, wherein said alarm video corresponding in time to said alarm event corresponds to an interval of time ending after said occurrence of said alarm event.

29. The security system of claim 27, wherein said alarm video corresponding in time to said alarm event corresponds to an interval of time ending after a predetermined duration.

30. The security system of claim 24, wherein said remote station is operable to control what constitutes said occurrence of said alarm event.

31. The security system of claim 24, wherein said remote station is operable to control activation of said base station.

32. The security system of claim 24, wherein said remote station is operable to control deactivation of said base station.

33. The security system of claim 24, wherein said remote unit is operable to access one or more functions of said base station.

34. The security system of claim 33, wherein said one or more functions of said base station comprises remote surveillance.

35. The security system of claim 24, wherein said central station is substantially continuously coupled to said base station through the Internet.

36. The security system of claim 35, wherein said central station is operable to detect in substantially real-time if said central station becomes uncoupled from said base station.

37. The security system of claim 24, wherein said alarm video further comprises audio.

38. The security system of claim 31, wherein said central station is operable to transmit audio signals to said base station, and said base station is operable to play said audio signals.

39. A security system, comprising:
- a network;
- a remote station coupled to said network;
- a central station coupled to said network;
- a base station coupled to said network, said base station secured against accesses, by said remote station, until said remote station has been authenticated by said central station;
- a video camera coupled to said base station;
- one or more sensor units coupled to said base station;
- wherein, to access said base station, said remote station first establishes a connection with said central station over said network and wherein, upon authentication of said remote station by said central station, said central station enabling establishment of a direct connection between said remote station and said base station over said network such that subsequent communications between said remote station and said base station bypass said central station.

40. The security system of claim 39, wherein the direct connection between said remote station and said base station over said network is a secure connection.

41. The security system of claim 39, wherein:

said one or more sensor units are configured to detect an occurrence of an alarm event and convey an indication of said occurrence of said alarm event to said base station; and said remote station is configured to define, for said base station, what constitutes an occurrence of an alarm event.

42. The security system of claim 39, wherein said remote station is configured to control activation and deactivation of said base station.

43. The security system of claim 39, wherein:

said video camera is operable to transmit video to said base station; and said remote station is configured for performing remote surveillance by controlling transmission of video, by said video camera, to said base station.

* * * * *

UNITED STATES PATENT AND TRADEMARK OFFICE
CERTIFICATE OF CORRECTION

PATENT NO. : 6,690,411 B2
DATED : February 10, 2004
INVENTOR(S) : Surendra N. Naidoo and William P. Glasgow It is certified that error appears in the above-identified patent and that said Letters Patent is hereby corrected as shown below:

Column 6,
Line 19, replace "thye" with -- the --;
Line 32, replace "cble" with -- cable --;

Column 8,
Line 4, delete "s";

Column 11,
Line 22, at the end of the claim add -- real time; --; and

Column 12,
Line 44, replace "31" with -- 37 --.

Signed and Sealed this

Fifteenth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,690,411 B2
APPLICATION NO. : 09/357196
DATED : February 10, 2004
INVENTOR(S) : Surendra N. Naidoo and William P. Glasgow It is certified that error appears in the above-identified patent and that said Letters Patent is hereby corrected as shown below:

Column 6,
Line 19, replace "thye" with -- the --;
Line 23, replace "cble" with -- cable --;

Column 8,
Line 4, delete "s";

Column 11,
Line 22, at the end of the claim add -- real time; --; and
Line 21, before "security" insert -- The --.

Column 12,
Line 44, replace "31" with -- 37 --.

This certificate supersedes the Certificate of Correction issued June 15, 2004.

Signed and Sealed this

Fifteenth Day of January, 2008

JON W. DUDAS
*Director of the United States Patent and Trademark Office*